US010194772B2

(12) United States Patent
Purgatorio et al.

(10) Patent No.: US 10,194,772 B2
(45) Date of Patent: Feb. 5, 2019

(54) SYSTEM FOR HEATING UP LIQUIDS WITH A COVER CASE/BOX FOR MOBILE PHONE (71) Applicant: Iuno, LLC, San Diego, CA (US)

(72) Inventors: Gianclaudio Purgatorio, Miglionico (IT); Alessandro Purgatorio, Marconia (IT); Vito Galasso, Miglionico (IT)

(73) Assignee: IUNO, LLC, San Diego, CA (US)

( * ) Notice: Subject to any disclaimer, the term of this patent is extended or adjusted under 35 U.S.C. 154(b) by 0 days.

(21) Appl. No.: 15/306,360

(22) PCT Filed: May 4, 2015

(86) PCT No.: PCT/IT2015/000121
§ 371 (c)(1),
(2) Date: Oct. 24, 2016

(87) PCT Pub. No.: WO2015/170356
PCT Pub. Date: Nov. 12, 2015

(65) Prior Publication Data
US 2017/0042372 A1 Feb. 16, 2017

(30) Foreign Application Priority Data

May 6, 2014 (IT) .............................. RM20140068 U
Sep. 29, 2014 (IT) .............................. RM20140158 U (51) Int. Cl.
F27D 11/00 (2006.01)
A47J 36/24 (2006.01)
(52) U.S. Cl.
CPC ....... *A47J 36/2466* (2013.01); *A47J 36/2472* (2013.01)

(58) Field of Classification Search
CPC ................ A47J 36/2461; A47J 36/2466; A47J 36/2472; H04J 7/0044; H04J 7/0063; H04J 7/0068; H02J 2007/0096
USPC .................................................. 219/438, 441
See application file for complete search history.

(56) References Cited

U.S. PATENT DOCUMENTS

| 3,931,494 | A | | 1/1976 | Fisher et al. |
| 5,129,033 | A | | 7/1992 | Ferrara et al. |
| 5,842,353 | A | * | 12/1998 | Kuo-Liang ........ A47G 19/2288 219/419 |
| 6,072,161 | A | | 6/2000 | Stein |
| 6,283,014 | B1 | | 9/2001 | Ng et al. |

(Continued)

OTHER PUBLICATIONS

The International Search Report and Written Opinion of the International Searching Authority for PCT/IT2015/000121, Iuno, LLC, dated Aug. 31, 2015 (related application).

(Continued)

*Primary Examiner* — Dana Ross
*Assistant Examiner* — Brandon Harvey
(74) *Attorney, Agent, or Firm* — Roeder & Broder LLP; Steven G. Roeder (57) ABSTRACT

The present invention relates to an assembly for the preparation of a heated beverage, comprising a case or cover or box (battery cover) (8) for mobile phone (60) or external device (6) comprising an internal seat for the corresponding insertion of at least a container (7), said container (7) comprising means (13) for the production of heat, wherein said container (7) comprises contacts (12) to electrically feed said means (13) when said container is inserted in the seat.

20 Claims, 11 Drawing Sheets (56) References Cited

U.S. PATENT DOCUMENTS

| | | |
|---|---|---|
| 6,565,903 B2 | 5/2003 | Ng et al. |
| 6,607,762 B2 | 8/2003 | Lazaris et al. |
| 6,730,890 B2 | 5/2004 | Kish et al. |
| 6,943,323 B2 | 9/2005 | Iannucci |
| 8,759,721 B1 | 6/2014 | Alexander |
| 2005/0227745 A1* | 10/2005 | Chiang .................. H04M 1/21 455/575.1 |
| 2007/0142022 A1* | 6/2007 | Madonna ............... H04N 7/163 455/352 |
| 2013/0069431 A1* | 3/2013 | Tseng ................... H02J 7/0044 307/43 |
| 2013/0200064 A1* | 8/2013 | Alexander ......... A47G 19/2288 219/441 |
| 2014/0069606 A1 | 3/2014 | Lee |
| 2014/0080553 A1 | 3/2014 | Torset et al. |
| 2014/0345475 A1 | 11/2014 | Trench Roca et al. |
| 2015/0005950 A1 | 1/2015 | Trench Roca et al. |
| 2015/0101940 A1* | 4/2015 | Ash ........................ H04M 1/21 206/216 |

OTHER PUBLICATIONS

Office Action from the State Intellectual Property Office of China, dated May 28, 2018, in Application No. 015800234647. This matter is related to the instant U.S. Appl. No. 15/306,360.

\* cited by examiner

SYSTEM FOR HEATING UP LIQUIDS WITH A COVER CASE/BOX FOR MOBILE PHONE

The present invention concerns an assembly for heating up liquids with a cover or case or box or battery-cover for mobile phone or other high-tech devices.

More in detail, the present invention concerns an assembly and system that allows to heating up coffee, alcoholic beverages and liquids or gel in general, increasing the temperature in a short time, consuming a small energy and the utilizing the energy provided by a battery that is present in a cover or case or box of a mobile electronic device or provided by the mobile phone or the electricity grid or various devices.

STATE-OF-THE-ART

Machines for preparing coffee are known.

Means for heating up an already prepared coffee, such as small pots for gas stoves, or microwaves oven are known as well.

These means, however, are not portable or in any case they are very bulky.

There is the need of a system and equipment for heating up a coffee or other beverages, which is of easy use in any place wherein a user is.

It is object of the present invention to provide a system and equipment which overcome the drawbacks of the prior art.

It is subject matter of the present invention an assembly for the preparation of a reheated beverage, comprising a device which includes control means in particular a CPU or other logical processor, the assembly comprising also at least a container of a material to be heated, the assembly being characterized in that:

said device comprises at least an internal seat for the corresponding insertion of said at least a container;

said at least a liquid or gel container comprises means for the production of heat, and in that:

said device comprises terminals placed in correspondence of said at least a seat and connected to said control means by means of suitable conductors;

said liquid or gel container comprises contacts to electrically feed said means of production of heat, said contacts being positioned in a way corresponding to said the terminals, so that, when said at least a liquid or gel container is respectively inserted in said at least a seat, said control means are adapted to feed said means for the production of heat, said control means being connectable to a source of internal or external electric energy.

According to a specific aspect of the present invention, in said device, means for the measurement of temperature of said liquid or gel are provided, which are connected to said control means.

According to a specific aspect of the present invention, a temperature sensor is placed in the proximity of said at least a seat.

According to a specific aspect of the present invention, said device comprises relay/transistor means which are controlled by said control means to allow the passage or interruption of the energy flowing from said electric energy source up to said terminals.

According to a specific aspect of the present invention, said control means are adapted to interface with a processor of a mobile phone or other mobile device by wired connection means, said wired connection means being adapted to transport data and/or electric energy.

According to a specific aspect of the present invention, said control means are adapted to interface to and be managed by a processor of a mobile phone or other mobile devices by wireless connection means, for example Wi-Fi or Bluetooth or Near-Field Communication ("NFC").

According to a specific aspect of the present invention, the assembly further comprises rapid removal means for the removal of said liquid or gel container, adapted to make the same container coming outside from said device.

According to a specific aspect of the present invention, the device comprises a display and at least a speaker for the communication towards the user about the preparation state of the reheated beverage, or for radio communications.

According to a specific aspect of the present invention, said device comprises touch command keys, keys for managing commands on a display, in/out audio and/or video inputs, an audio amplifier, an electronic board, an aux input, a USB port, a Webcam, a AM/FM radio receiving module.

According to a specific aspect of the present invention, said device is provided with touch key for switching on, switching off or positioning of the devices in commands waiting mode.

According to a specific aspect of the present invention, said wired connection means comprise a connector and an electronic module which are configured for the connection of a mobile phone or other mobile device by wire for the data communication, in particular commands for said control means, and for the electric connection to a device or to power grid to receive energy or recharge the internal battery.

According to a specific aspect of the present invention, said control means are fed by a battery internal to said device, which is configured to be recharged by an external energy source.

According to a specific aspect of the present invention, said device is provided with LED adapted to indicate the charging status of said battery.

According to a specific aspect of the present invention, said device is a cover or case or box or battery-cover for smartphone, tablet or other high-tech devices.

According to a specific aspect of the present invention, said cover or case or box or battery-cover comprises a fixed male connector for the electric and data connection to a corresponding female connector of said mobile device.

According to an aspect of the invention, said device is a mobile phone and said source of electric energy is the battery of the mobile phone.

It is further specific subject-matter of the present invention a device for the preparation of a reheated beverage as above defined; the device being adapted to receive said at least a liquid or gel container.

It is further specific subject-matter of the present invention a container of liquid, characterized in that it comprises means for the production of heat in contact to said liquid, such means being connected to contacts adapted to be electrically connected to a electric energy source, as above defined.

According to a specific aspect of the present invention, it comprises refilling or discharge means and closure/seal means of said refilling means.

According to a specific aspect of the present invention, the resistor of the container is in direct contact with the material to be heated or is separated by other separation material adapted to convey the heat produced by the resistor.

According to a specific aspect of the present invention, the container is closed on all sides, only the contacts protruding from the container.

The invention will be now described by way of illustration but not by way of limitation, with particular reference to the drawings of the enclosed figures, wherein.

DETAIL DESCRIPTION OF EMBODIMENTS OF THE INVENTION

Figure 1:
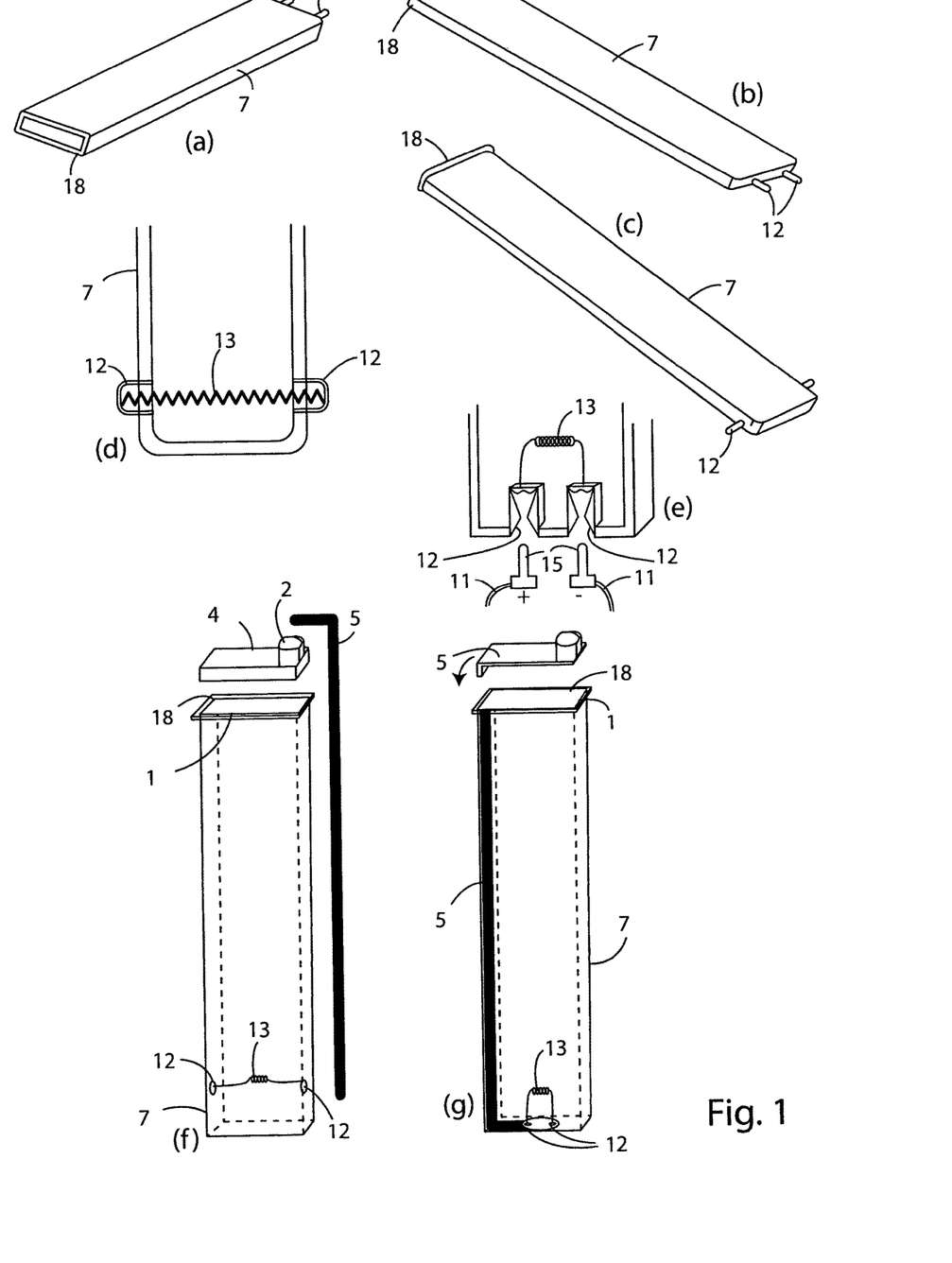
FIG. 1 shows a container for liquid or gel according to the invention, to be connected to a cover-case/box (battery-cover) for mobile phone, tablet or other mobile device.

Making reference to FIG. 1, an elongated container or "capsule" 7 is apt to contain liquid or gel (for example but not exclusively coffee), and presents on its surface two contacts 12 between which an electric resistance 13 is connected, which is internal to the volume of the capsule (the resistor of the capsule 13 can have varying shape and be of various materials, it also can be in direct contact with the material to be heated, solid or liquid, or be in indirect contact through a heat conducting material). The capsule can contain besides liquids or gels such as coffee, milk, tea, liquors, also solid or semi-solid foods to be heated.

The contacts 12 are external and such to contact respective contacts between which a voltage is created. Such contacts can be placed on any side of the capsule.

Between the two contacts 12, the resistance 13 is inserted in series, which is internal to the container 7. In such a way, the resistance 13 finds itself in contact with the liquid internal to the container and therefore, when it is run through by current, can heat up the same liquid.

The capsule container, on its top end, is provided with filling up or discharge collector 18 which can be open to allow the discharge or filling up of the liquid/gel. It can be provided with a rim 1 to increase the adhesion surface to allow the gluing of a seal tongue 5. If one wants to pour the heated up liquid, it is necessary to remove the tongue 5. Such tongue 5 may be metallic and can be removed as for the traditional cans. The filling up collector can be closed by a cap 4 with a spout 2 which is used to pour the heated up liquid into a small cup or directly in the mouth. The spout 2 in the capsule 7 is advantageously closed by a tongue 5, which can extend even up to one of the two contacts 12 and be conductive, to allow to shift the input point of the electrical current.

The capsule 7 can also be a fully enclosed body such as box or "brick", and be constituted only by its walls, by means of contact 12 and resistor 13, so for example if it is in material such as polylaminate or tetrapak, it would be closed/sealed in the factory, for example heat sealed, glued, microwave welded or closed by other method of closure, after being refilled with liquid or gel and at the time of its use this may be open by tearing to allow discharge of the liquid or gel; in the case where the capsule is made of another, more or less rigid material, this can be opened by breaking the same and allow release of the liquid or gel; optionally one could operate on one side of the capsule with a straw that, acting with pressure, succeeds in making a hole on the surface of the capsule allowing the potential discharge of the content.

The resistor 13 is in contact with the liquid or gel, however, a variation of the capsule provides that the electrical resistor 13 is not directly in contact with the liquid or gel to be heated but is surmounted by another material or is sandwiched between 2 layers constituting of the capsule itself, one of which will be in contact with the liquid and send the heat produced by the resistor within the capsule by heating the liquid itself.

The resistance 13 of the capsule 7 can also be "self destructive", that is, if the capsule were to be inserted empty, free liquid or gel, in its housing and the heating were started, this, for security reasons, will self-break because, since it is not able to exchange heat with the liquid or gel, it will arrive at melting temperature immediately in a short time and then will break securing from harm both the capsule itself that the device that contains it.

In FIG. 1 one recognizes in (a) and (b) a capsule with contacts 12 on a base, in (c) a capsule in perspective view with lateral contacts, in (d) a section of the capsule of figure (c). In FIG. 1 (*e*) one of the contact modes of the contacts 12 with respective contacts 15 within the device according to the invention is shown, in particular the contact mode is press fitting. With 11 the conductor leading current to the terminals 15 for the heating up is indicated. In FIG. 1 (*f*) the closure of the capsule 7 with a cup 4 with spout 2 and in FIG. 1 (*g*) the closure with tongue 5 are illustrated.

Figure 2:
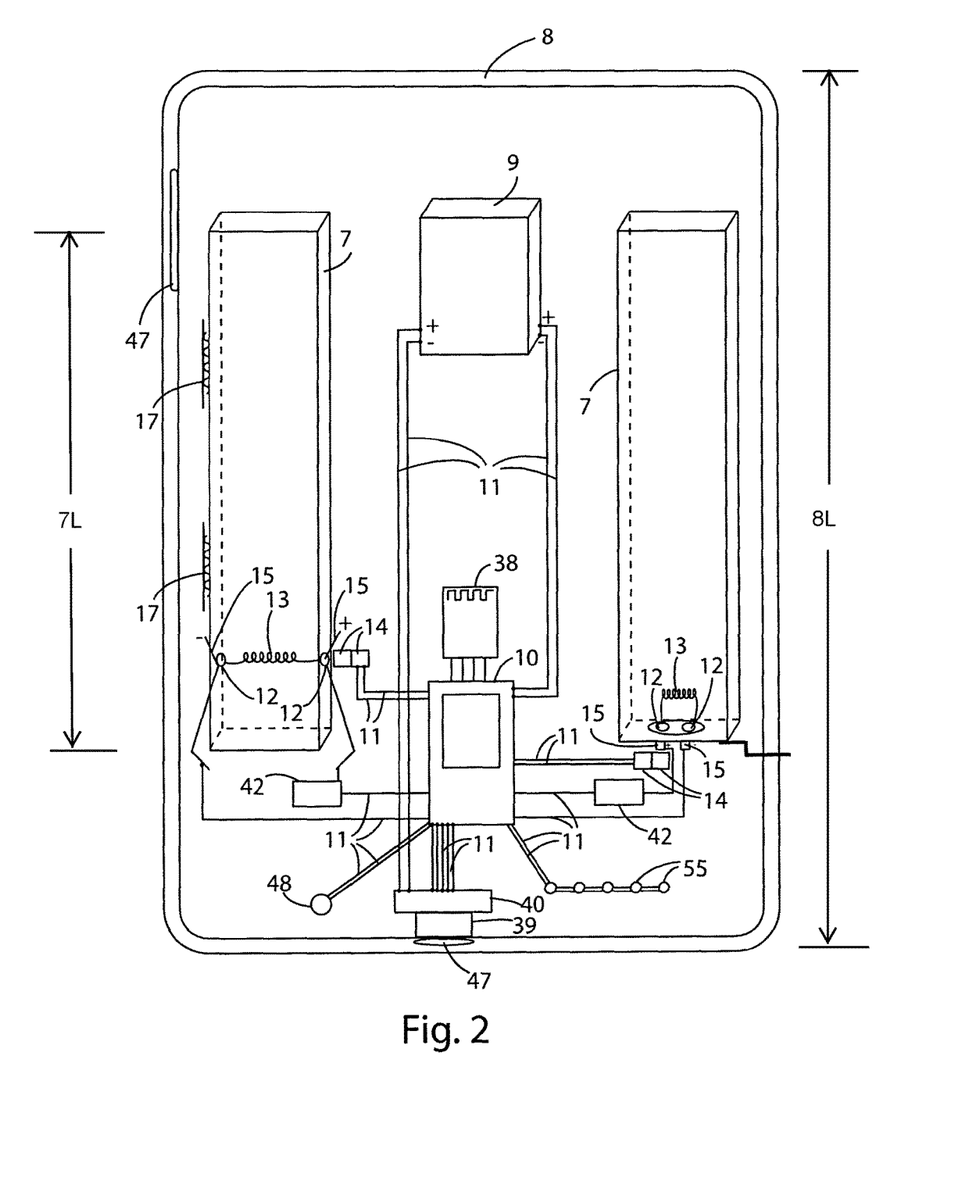
FIG. 2 shows a cover-case/box (battery-cover) for mobile phone, which is suitable to receive the container of FIG. 1.

The capsule 7 can have various dimensions and forms. As illustrated in FIG. 2, the capsule 7 (or container) has a container length 7L that is the longest axis of the capsule 7 (or container). The seat suitable to house it will be shaped correspondingly. The capsule can be made of various materials such as plastic, metal, recyclable materials, laminated materials, tetrapak or the like, paper, vegetable starch etc., all materials suitable to be able to contain a liquid or gel.

The contacts of the capsule can be of various shape and length, therefore coated, elongated toward the outside or toward the inside of the capsule, then the terminals 15 of the device 6,8 will have the form of the case which is more suitable to perform their function on the basis of the shape of the contacts 12 of the capsule.

Figure 3:
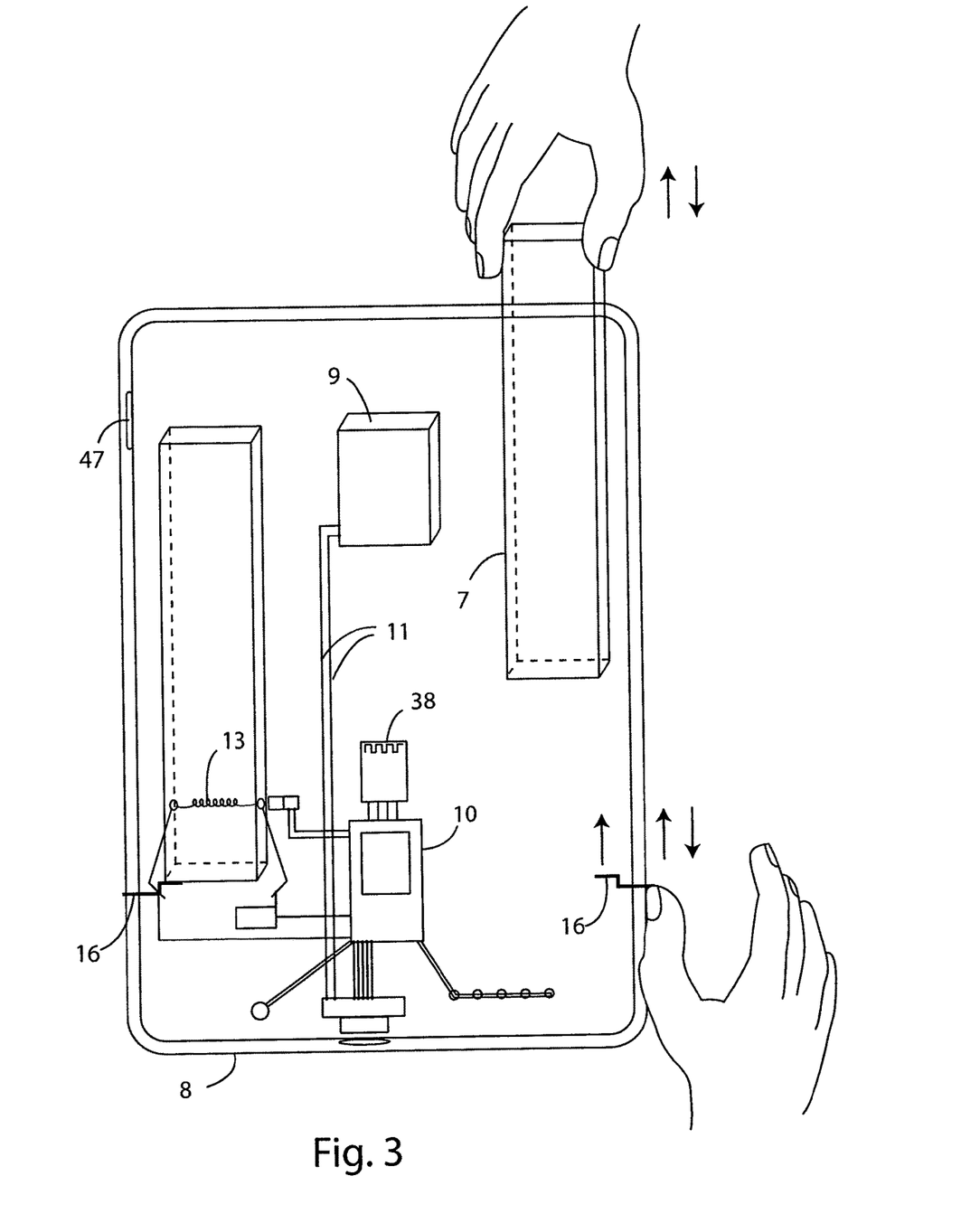
FIG. 3 shows the structure of FIG. 2, while the container of FIG. 1 is extracted/inserted.

Making reference to FIGS. 2 and 3, the capsule 7 is inserted in a suitable seat of a cover-case/box (battery-cover) device for mobile phone or tablet 8. Additionally, as shown in FIG. 2, the device 8 has a device length 8L that is the longest axis of the device 8. As illustrated in this embodiment, the capsule 7 (or container) is oriented such that the container length 7L extends in substantially the same direction as the device length 8L. As utilized herein, the length of a three-dimensional object, e.g., the container length 7L of the container 7 and/or the device length 8L of the device 8, is the greatest of the three dimensions of the object.

The cover-case/box (battery-cover) device 8 for mobile phone comprises a battery 9, a processor 10 connected to said battery 9, and optionally, even individually: a wired or wireless communication module 38 (Wi-Fi, Bluetooth, NFC etc.) and cable communication module 39-40, at least a relay/transistor 42, temperature and security sensors 14, electrical terminals 15, all connected by conductors 11 to the processor 10 (for example wires), which feed the whole system.

This is made so that the capsule 7 and the relevant resistance 13 can be fed either by an external battery comprised in the cover or by the same battery of the mobile phone or tablet.

Figure 10:
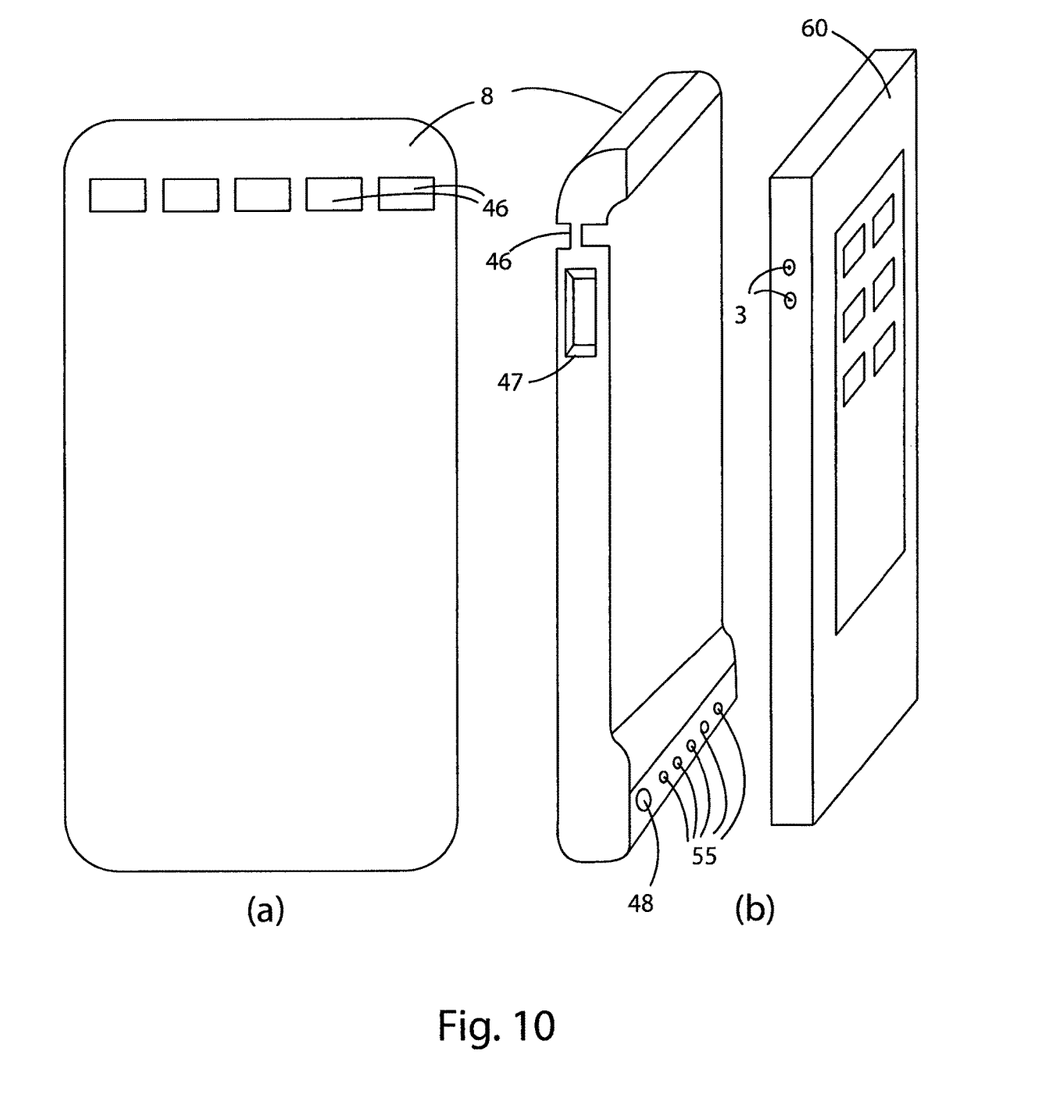
FIG. 10 shows a further embodiment of the system according to the invention.

On the sides of the body of the cover-case/box (battery-cover) 8 for mobile phone, it is possible to find one or more slots 47 suitable to allow the user to operate on keys 3 (for example for the acoustic volume) of the mobile phone 16 when inserted in the housing within the cover-case/box (battery-cover) 8 for mobile phone, as in FIG. 10 (see the following), or to allow the passage of an external connector, which will insert into the internal connector 39, to allow the transmission of data or commands or electric energy towards the CPU 10 and the battery 9. Moreover, on the sides of the body of the cover-case/box (battery-cover) there are various LEDs 55 which indicate the charging status of the battery internal to the device 8.

From the CPU 10 comprised in the same cover 8, further conductors 11 depart, which pass through at least a relay or transistor 42, and which terminate in terminals 15 which come into contact with the security sensors 14 and the contacts 12 of the capsule 7 between which a resistance 13 is inserted. In such a way, the CPU 10 decides when transferring energy to the resistance 13, under the command sent from the outside. The mobile phone or other mobile device sends the commands to the CPU of the cover which will receive said commands by means of the module 38 of wireless communication (Wi-Fi, Bluetooth, NFC) or by wire by means 39, 40, said means 38, 39, 40 are connected to the CPU 10 of the cover, and therefore the CPU of the cover controls the functioning of the same cover and the heating up of the liquid, or the interruption of the whole functioning.

A temperature sensor 14 is also provided to control the temperature of the capsule 7 and therefore to establish when the heating is to be interrupted.

Still further, holding means 17 for holding the capsule 7 in the dedicated the seat are provided, for example formed as corrugation making interference with the surface of the capsule, or constructed with a push-and-pull mechanism.

It is therefore clear that the capsule 7 has a seat within the cover 8, wherein it can be inserted or extracted as in FIG. 3. The simple insertion brings into contact the contacts 12 and the terminals 15 and therefore allows the current passage in the resistance 13 upon "authorization" of the CPU 10.

The reference 16 is a sliding tongue that is operable from outside the cover 8, which allows to pull out the capsule by some millimeters towards the extraction direction. This makes the capsule 7 come out from the body of the cover to be able to extract it then completely by the hands.

Figure 4:
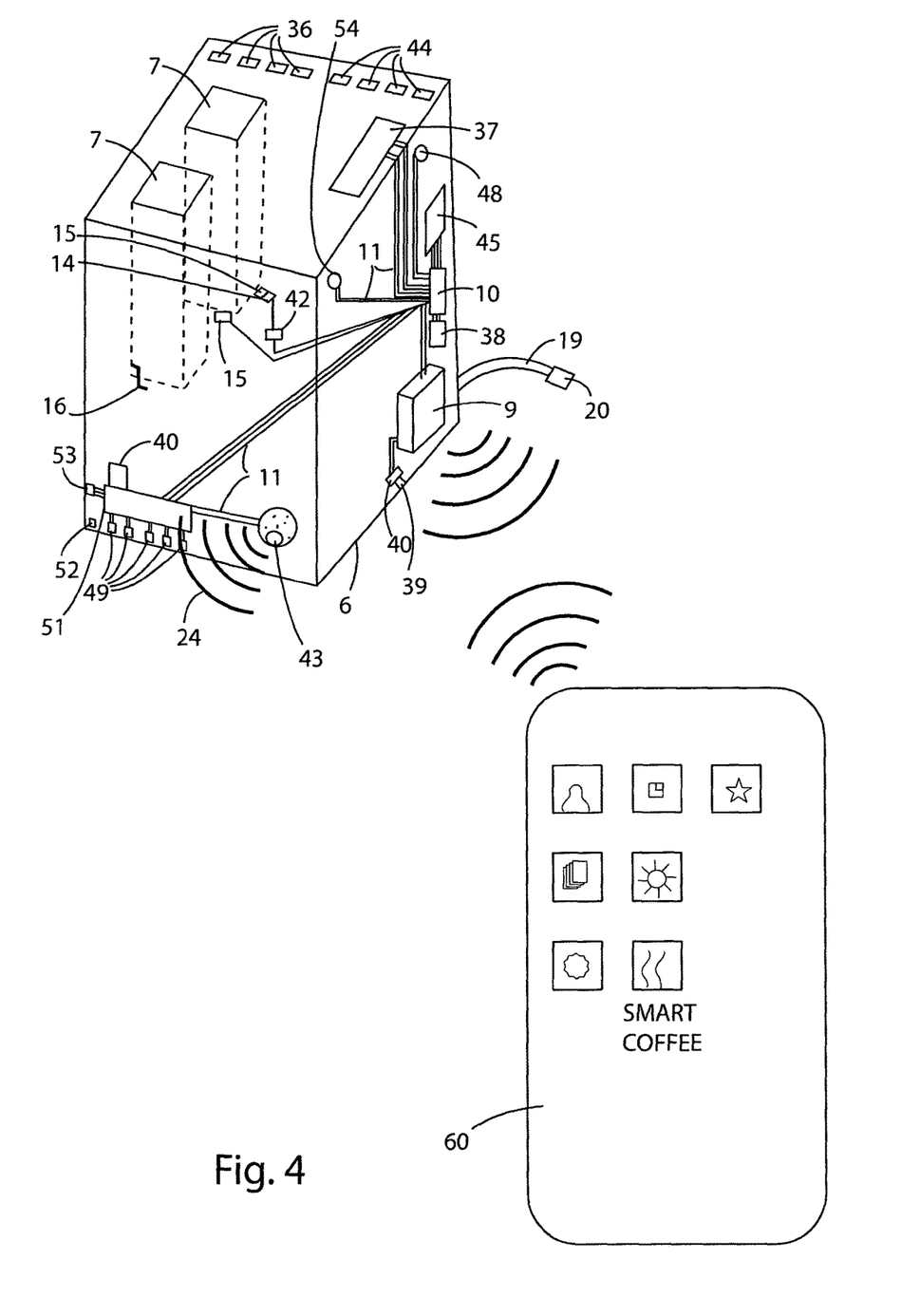
FIG. 4 shows a device to be connected wireless or wired to a mobile phone or other device, but functioning also autonomously in the manual mode, and wherein the container of FIG. 1 is to be inserted.

Making now reference to FIG. 4, a device 6 is described which is separated from the mobile phone 60 or from the cover-cases/box (battery-cover) for mobile phone 8, wherein it is possible to insert the capsules 7 (even more the one).

This device is provided with a battery 9, processor 10, communication module (for example Wi-Fi, Bluetooth, NFC) 38 by which the device 6 can receive the commands sent by the mobile phone or other devices in wireless mode, at least a relay/transistor 42, at least a security sensor 14, means for charging and transmission of commands from the outside by means of electric grid or from the mobile phone 39, 40, terminals 15, all connected by conductors 11 (for example wires) which feed the whole system.

The external device 6 can also be provided with its own battery 9, and separated touch commands 36, and commands 44 to manage the display and the other functions, a display 37, in such a way that the connection to the mobile phone is not the only one needed for its functioning; moreover, it can optionally be provided with a capsules injection system 16 and at least a speaker 43 which serves to acoustically warn the users about the preparation state of the beverage or for listening to AM/FM radio stations, by means of a radio reception module 45 placed in the proximity of the processor and operable from remote with the mobile phone 60 or directly from the function keys 44 and the display 37 placed on the body of the device 6.

The external device 6 can optionally be further provided on the sides with in/out audio and video inputs 49, audio amplifier 50, electronic board 51 adapted to read and reproduce audio and video files in various formats and compressions, aux input 52, USB port 53, at least an audio speaker 53, at least Webcam 54, cable and connector 19-24 for data input, commands and electric energy, all connected by conductors 11 to the electronic boards (51, 45, 10).

Making now reference to FIGS. 5-8, the functioning of the system 8 according to the invention by means of an app on the mobile phone or other device is illustrated.

Figure 5:
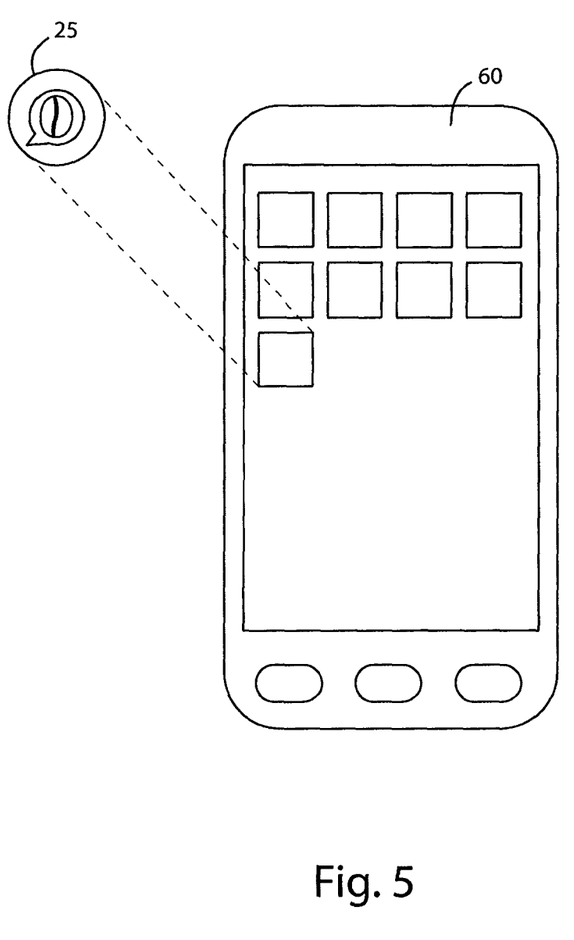
FIG. 5 shows an example of icon on a mobile phone, which refers to an app for the heating up of liquids with the system according to the invention.
Figure 6:
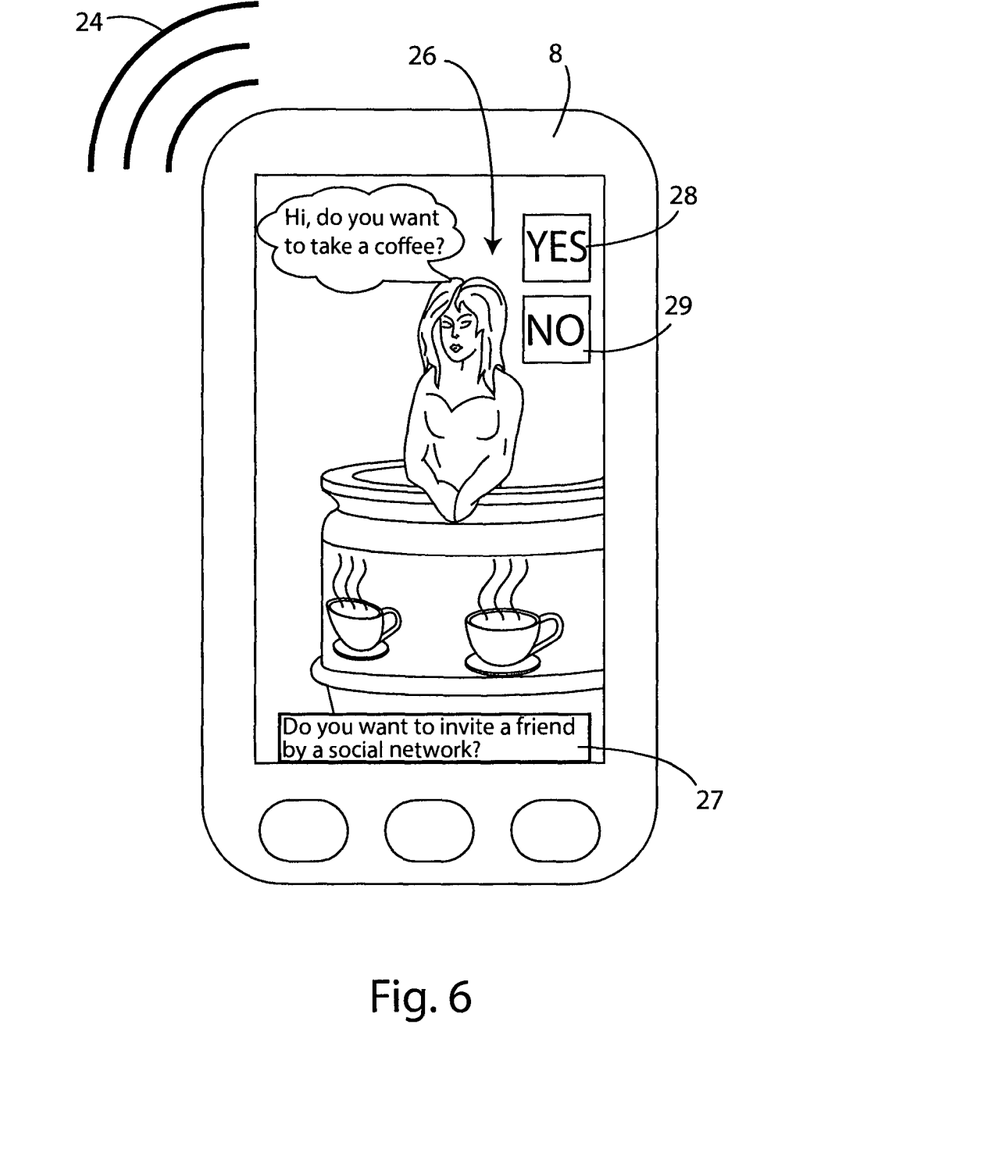
FIG. 6 shows an example of initial user interface once the app of FIG. 5 is executed.

The mobile phone 60 presents an icon 25 of an app, by which the app is run. A screenful 26 is visualized, wherein activation keys 28 are present, which activate the heating of the capsule (not shown, but internal to the cover-case/box (battery-cover) 8 for mobile phone or placed in said seat of the external device 6 as in the previous figures), or quit key 29. It is possible to provide a key or bar 27 to invite friends to drink coffee from remote by a social network, by which it is possible to send and receive files, audios, videos, photos, text messages etc. The app can function also with the help of acoustic signals 24.

Figure 7:
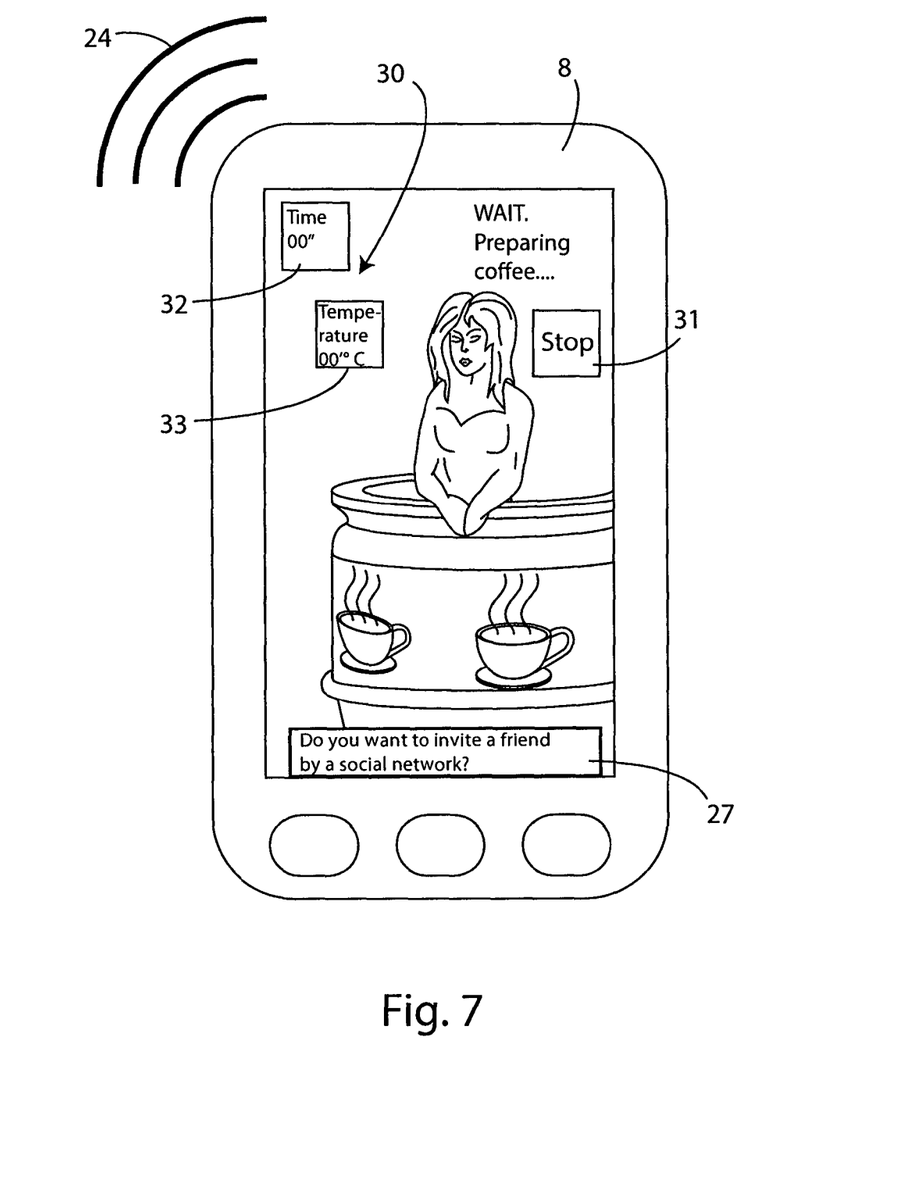
FIG. 7 shows a further user interface visualized by the app of FIG. 5 while the liquid is heated up.

Subsequently, if the user chooses to prepare (heat up) the coffee (or any other liquid or gel contained in the capsule), then the achieved temperature is visualized in 33 and the elapsed time or the time foreseen for the preparation is visualized in 32. A stop key 31 is also visualized.

Figure 8:
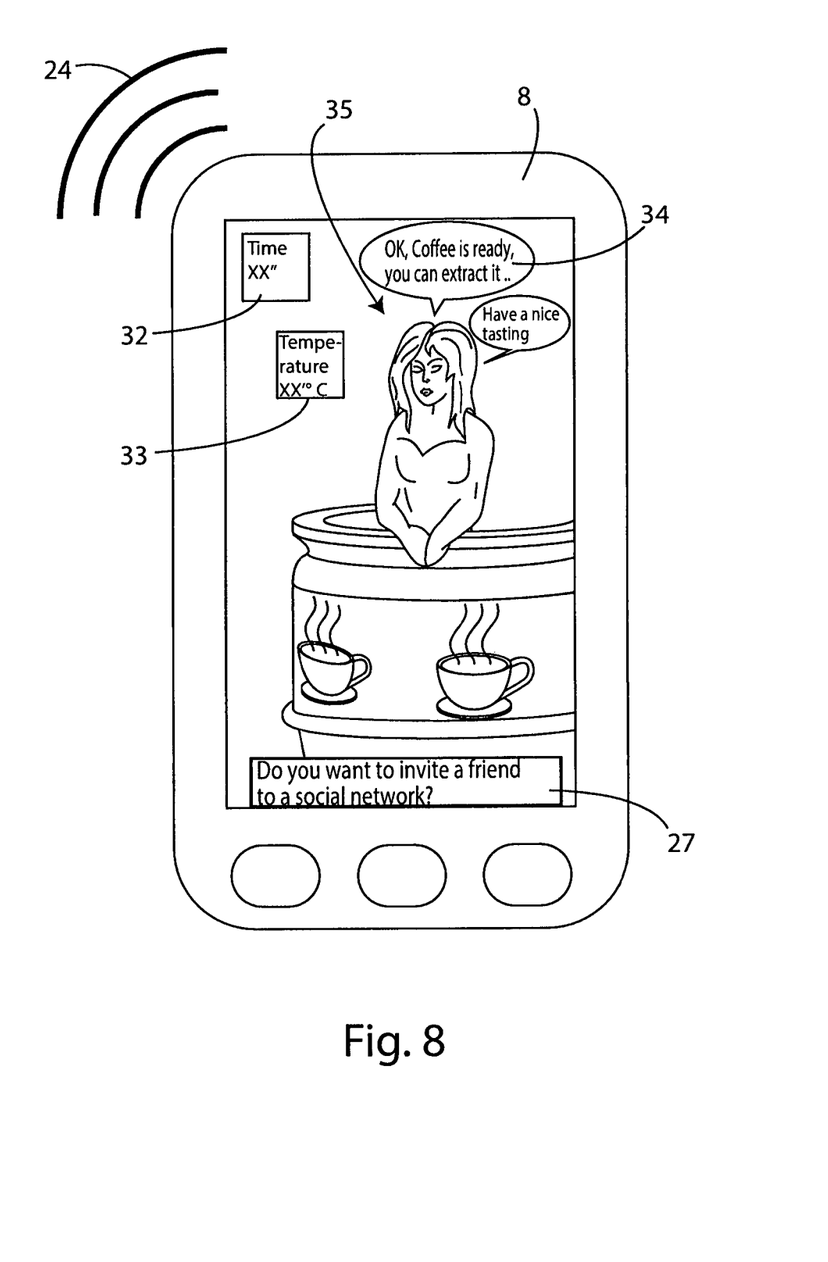
FIG. 8 shows a further user interface visualized by the app at the end of the heating up of the liquid, utilizing the system of the present invention.

In the final screenful 35, an audio and video message of achieved preparation is provided: the capsule is ready to be extracted for the tasting of the beverage.

Coming back to the external device which has been previously described, optionally the cover-case/box (battery-cover) for mobile phone is provided with a part of its body which is extensible by means of the elongation of extensible or removable locking pins 46 of some millimeters and is re-closable to allow inserting the mobile phone in the dedicated recess adapted to house and fix it in order to become an only body with the cover-cases/box (battery-cover) for mobile phone once the body has been re-closed, a body which is extensible and re-closable as in FIG. 10.

The extensible body is provided with slidable locking pins 46 which at the end of stroke do not allow the complete unlocking from the body of the cover-case/box (battery-cover) for mobile phone, optionally they can also unlock themselves, or always the device 8 having external edges fixed and allow the insertion of the mobile phone by applying a slight pressure on it allowing the interlocking within the device 8. Both the cover-case/box (battery-cover)

for mobile phone 8 and the external device 6 will be provided with an external key 48 of switching on/off placed on the body, for the switching on of the electronic system which, by means of a connection to the processor, will put all the functioning systems in a standby and wireless communication signal search mode, in order to be ready to be activated upon command of the user.

The button 48 may also have another function. According to an embodiment, the device 6,8 can be equipped with a button 48 to initiate the analog manual heating which allows the passage of the electrical energy directly from the energy source to the contacts 15 that feed means 12,13 of the capsule. If the manual process is started in this way, this will cease to operate when the predetermined maximum temperature is reached and interrupt by the temperature sensor 14 or may interrupt at a predetermined time by means of a simple microcontroller which on time will cause an interruption of the passage of electric energy.

Figure 9:
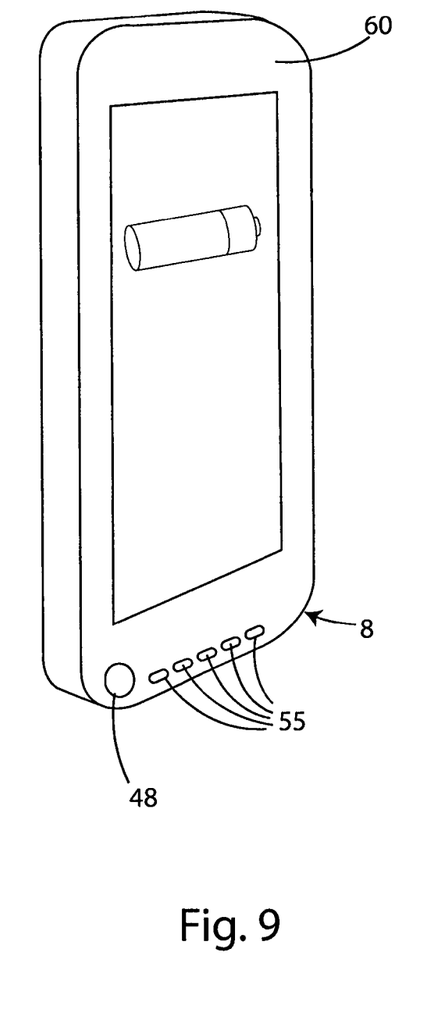
FIG. 9 shows how the mobile phone is housed in the cover-case/box (battery-cover) for mobile phone.

In FIGS. 9 and 10, reference 55 has been used, on the body of the device 8, to refer to the LEDs constituting the battery charge indicator.

Figure 11:
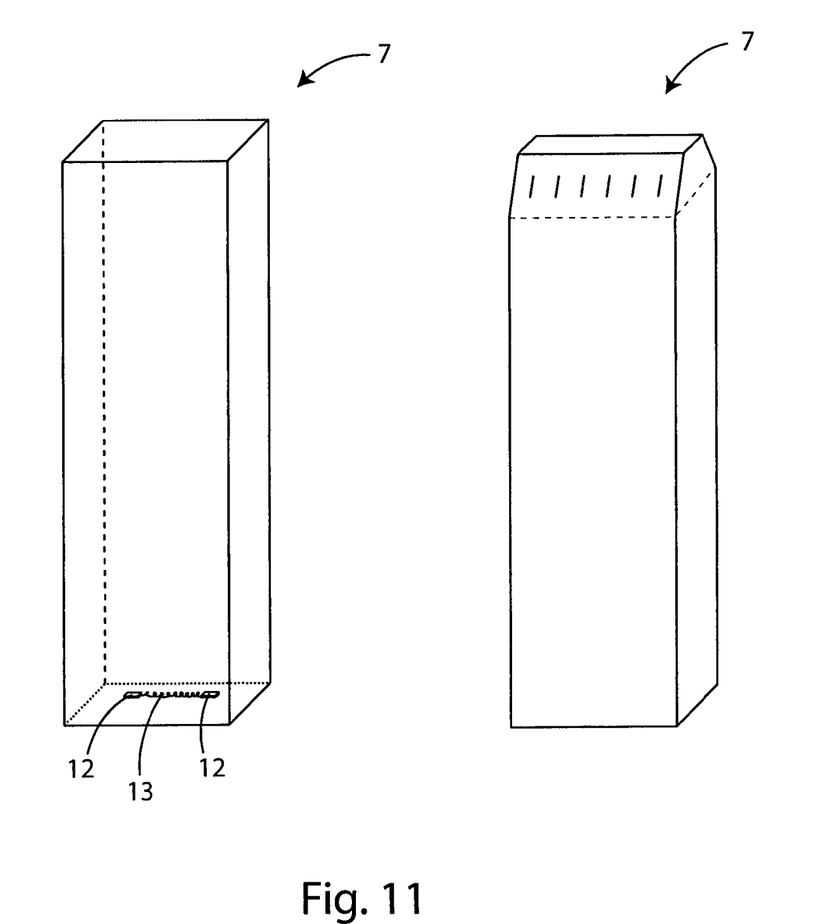
FIG. 11 shows an embodiment of the container for liquid or gel according to the invention.

In FIG. 11 a different capsule is depicted, that does not contain the means of refilling, but is completely closed, and may conveniently be open by tearing or breaking it.

The devices 6 and 8 are provided with a connector 39 and electronic module 40 which allow also the connection of the devices by wire, for the communication of data (commands for the CPU 10) and electric communication (for the recharging of the internal battery 9).

Optionally, the cover according to the invention comprises a male connector inserted in the female connector 39, in such a way that, when the mobile device enters in the cover, said male connector automatically enters in the female connector of the corresponding mobile device so as to create immediately a connection between the mobile device and the heating device 8.

According to an embodiment, said assembly for preparing a heated beverage, which works manually or controlled by smartphone or other device may be installed on cars, boats or any other transport means or various fixed bodies constituting other objects of common use.

With this system according to the invention, one has a tool which is always at disposal, rapid and cheap to heat up beverages, thanks to the fact that it makes use of cover-case/box (battery-cover) for mobile phone or external device, which are today widespread.

In the foregoing, preferred embodiments have been described and variations to the present invention have been suggested, but it is to be understood that those skilled in the art with be able to modify and change them without thereby falling outside the relevant scope of protection, as defined in the enclosed claims.

The invention claimed is:

1. An assembly for use with one of a smartphone and a tablet for heating one of a liquid and a gel, the one of a smartphone and a tablet including a controller and a battery, the assembly comprising:
    a container that is configured to receive and retain the one of a liquid and a gel, the container having a container length, the container further comprising a movable lid;
    a device including a seat that is configured to selectively receive the container therein, the device being adapted to be secured to the one of a smartphone and a tablet, the device having a device length; wherein when the container is positioned within the seat, the container is oriented such that the container length extends in substantially the same direction as the device length; and
    a means for the production of heat that is secured to at least one of the container and the device, the means for the production of heat being in electrical communication with the device when the container is positioned in the seat of the device; wherein the means for the production of heat is at least partially controlled by the controller to heat the one of a liquid and a gel.

2. The assembly of claim 1 wherein the device is one of a cover, a case, a box and a battery cover of the one of a smartphone and a tablet.

3. The assembly of claim 1 wherein the device includes a device controller having a processor, and a device battery; and wherein the device controller is adapted to interface with the controller to control the heating of the one of a liquid and a gel.

4. The assembly of claim 3 wherein the device battery is rechargeable by an external energy source.

5. The assembly of claim 3 wherein the device controller is electrically connected to the controller via a wired connection.

6. The assembly of claim 3 wherein the device controller is electrically connected to the controller via a wireless connection.

7. The assembly of claim 1 wherein the means for the production of heat includes a resistor and a pair of contacts that are secured to the container and a pair of terminals that are secured to the device; and wherein the pair of contacts are positioned to engage the pair of terminals when the container is positioned in the seat of the device.

8. The assembly of claim 7 wherein the pair of contacts are coupled to the resistor near either end of the resistor; and wherein each of the pair of terminals is configured to engage a different contact when the container is positioned in the seat of the device.

9. The assembly of claim 8 wherein the resistor is in direct contact with the one of a liquid and a gel that is retained in the container.

10. The assembly of claim 1 further comprising a temperature sensor that is in electrical communication with the controller, the temperature sensor being configured to sense a temperature of the one of a liquid and a gel that is retained in the container.

11. The assembly of claim 10 further comprising at least one of an audio indicator and video indicator, which provide an indication of the temperature of the one of a liquid and a gel that is retained in the container as sensed by the temperature sensor.

12. A combination including one of a smartphone and a tablet, and the assembly of claim 1 that is configured to heat the one of a liquid and a gel that is retained in the container when the device is secured to the one of a smartphone and a tablet, and when the container is positioned in the seat of the device.

13. An assembly for use with one of a smartphone and a tablet for heating one of a liquid and a gel, the one of a smartphone and a tablet including a controller and a battery, the assembly comprising:
    a container that is configured to receive and retain the one of a liquid and a gel, the container having a container length, the container further comprising a movable lid;
    a device including a seat that is configured to selectively receive the container therein, the device being one of a cover, a case, a box and a battery cover of the one of a smartphone and a tablet, the device including a device controller having a processor, and the device having a device length; wherein when the container is positioned within the seat, the container is oriented such that the container length extends in substantially the same direction as the device length; and a means for the production of heat including a resistor and a pair of contacts that are coupled to the container and a pair of terminals that are coupled to the device;

wherein the pair of contacts are positioned to engage the pair of terminals when the container is positioned in the seat of the device; and wherein the device controller is adapted to interface with the controller to control the heating of the one of a liquid and a gel that is retained in the container.

14. The assembly of claim 13 wherein the device further includes a device battery that is electrically connected to the device controller.

15. The assembly of claim 13 wherein the device controller is electrically connected to the controller via a wired connection.

16. The assembly of claim 13 wherein the device controller is electrically connected to the controller via a wireless connection.

17. The assembly of claim 13 wherein the pair of contacts are coupled to the resistor near either end of the resistor; and wherein each of the pair of terminals is configured to engage a different contact when the container is positioned in the seat of the device.

18. The assembly of claim 17 wherein the resistor is in contact with the one of a liquid and a gel that is retained in the container.

19. The assembly of claim 13 further comprising a temperature sensor that is in electrical communication with the controller, the temperature sensor being configured to sense a temperature of the one of a liquid and a gel that is retained in the container.

20. A combination including one of a smartphone and a tablet, and the assembly of claim 13 that is configured to heat the one of a liquid and a gel that is retained in the container when the device is secured to the one of a smartphone and a tablet, and when the container is positioned in the seat of the device.

* * * * *

UNITED STATES PATENT AND TRADEMARK OFFICE
CERTIFICATE OF CORRECTION

PATENT NO. : 10,194,772 B2
APPLICATION NO. : 15/306360
DATED : February 5, 2019
INVENTOR(S) : Gianclaudio Purgatorio, Alessandro Purgatorio and Vito Galasso Page 1 of 1

It is certified that error appears in the above-identified patent and that said Letters Patent is hereby corrected as shown below:

Page 2, under OTHER PUBLICATIONS, replace "Application No. 015800234647" with
--Application No. 2015800234647--

Signed and Sealed this
Second Day of April, 2019

Andrei Iancu
*Director of the United States Patent and Trademark Office*